United States Patent
Appia

(10) Patent No.: US 10,542,248 B2
(45) Date of Patent: Jan. 21, 2020

(54) HIERARCHICAL BINARY STRUCTURED LIGHT PATTERNS

(71) Applicant: Texas Instruments Incorporated, Dallas, TX (US)

(72) Inventor: Vikram VijayanBabu Appia, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 12 days.

(21) Appl. No.: 15/470,541

(22) Filed: Mar. 27, 2017

(65) Prior Publication Data

US 2017/0201739 A1  Jul. 13, 2017

Related U.S. Application Data

(63) Continuation of application No. 14/312,549, filed on Jun. 23, 2014, now Pat. No. 9,609,306.

(Continued)

(51) Int. Cl.
*H04N 13/254* (2018.01)
*H04N 13/271* (2018.01)
(Continued)

(52) U.S. Cl.
CPC ....... *H04N 13/254* (2018.05); *G01B 11/2513* (2013.01); *G06T 7/40* (2013.01);
(Continued)

(58) Field of Classification Search
CPC . G06T 7/521; G06T 7/40; G06T 2207/20016; H04N 13/254; H04N 13/271; H04N 2013/0081; G01B 11/2513
See application file for complete search history.

(56) References Cited

U.S. PATENT DOCUMENTS 6,195,473 B1  2/2001  Zable et al.
6,332,044 B1  12/2001  Loce et al.
(Continued)

OTHER PUBLICATIONS

Ruigang Yang and Marc Pollefeys, "Multi-Resolution Real-Time Stereo on Commodity Graphics Hardware", 2003 IEEE Computer Society Conference on Computer Vision and Pattern Recognition, Jun. 18-20, 2003, pp. 211-217 (pp. 1-7 in submitted copy).

(Continued)

*Primary Examiner* — Tracy Y. Li
(74) *Attorney, Agent, or Firm* — Ebby Abraham; Charles A. Brill; Frank D. Cimino

(57) ABSTRACT

A method of image processing in a structured light imaging device is provided that includes receiving a captured image of a scene, wherein the captured image is captured by a camera of a projector-camera pair in the structured light imaging system, and wherein the captured image includes a pre-determined hierarchical binary pattern projected into the scene by the projector, wherein the pre-determined hierarchical binary pattern was formed by iteratively scaling a lower resolution binary pattern to multiple successively higher resolutions, rectifying the captured image to generated a rectified captured image, extracting a binary image from the rectified captured image at full resolution and at each resolution used to generate the pre-determined hierarchical binary pattern, and using the binary images to generate a depth map of the captured image.

18 Claims, 6 Drawing Sheets

Related U.S. Application Data

(60) Provisional application No. 61/846,730, filed on Jul. 16, 2013.

(51) Int. Cl.

| | | |
|---|---|---|
| *G01B 11/25* | (2006.01) | |
| *G06T 7/40* | (2017.01) | |
| *G06T 7/521* | (2017.01) | |
| *H04N 13/00* | (2018.01) | |

(52) U.S. Cl.
 CPC ............ *G06T 7/521* (2017.01); *H04N 13/271* (2018.05); *G06T 2207/20016* (2013.01); *H04N 2013/0081* (2013.01)

(56) References Cited

U.S. PATENT DOCUMENTS

| | | | |
|---|---|---|---|
| 2005/0018918 A1* | 1/2005 | Keithley | G06T 5/001 382/254 |
| 2007/0115484 A1* | 5/2007 | Huang | G01B 11/2527 356/604 |
| 2008/0117445 A1* | 5/2008 | Masuda | G03G 15/326 358/1.9 |
| 2011/0080471 A1* | 4/2011 | Song | G01B 11/245 348/46 |
| 2012/0293700 A1* | 11/2012 | Drouin | G02B 3/005 348/333.1 |
| 2013/0070060 A1* | 3/2013 | Chatterjee | H04N 5/2258 348/47 |
| 2013/0098127 A1* | 4/2013 | Isei | B21C 51/00 72/17.3 |
| 2014/0028801 A1 | 1/2014 | Tin | |
| 2015/0003684 A1 | 1/2015 | Appia | |

OTHER PUBLICATIONS

Prosecution History for U.S. Appl. No. 14/312,549, dated Jun. 23, 2014 through Mar. 10, 2017 (221 pages).

* cited by examiner

HIERARCHICAL BINARY STRUCTURED LIGHT PATTERNS

CROSS-REFERENCE TO RELATED APPLICATIONS

This application is a continuation of U.S. patent application Ser. No. 14/312,549, filed Jun. 23, 2014, which claims the benefit of U.S. Provisional Patent Application Ser. No. 61/846,730, filed Jul. 16, 2013, both of which are incorporated herein by reference in their entirety.

BACKGROUND OF THE INVENTION

Field of the Invention

Embodiments of the present invention generally relate to generating hierarchical binary structured light patterns and using such patterns in a structured light imaging device.

Description of the Related Art

In structured light imaging devices, a projector-camera pair is used to estimate the three-dimensional (3D) depth of a scene and shape of objects in the scene. The principle behind structured light imaging is to project patterns on objects/scenes of interest and capture images with the projected pattern. The depth is estimated based on variations of the pattern in the captured image in comparison to the projected pattern.

Structured light imaging devices can be broadly classified into two categories: single fixed pattern devices and dynamic multi-pattern devices. Dynamic pattern structured light imaging devices project several patterns with varying spatial frequencies, sweeping through the various patterns. The higher-frequency patterns can discern the finer details in the scene while lower spatial frequency patterns increase the range of depth values. Such a device generally requires that the scene be stationary during the entire capture process.

Fixed pattern structured light imaging devices project a single pattern on the scene and use a single captured image to estimate depth. Such devices are preferable when the objects in the scene are not stationary. These fixed pattern devices typically use a pattern with a single spatial frequency that is selected as a trade-off between capturing details in the scene and increasing the depth range, i.e., a higher spatial frequency pattern will capture details in the scene better whereas a lower frequency pattern will increase the depth range.

SUMMARY

Embodiments of the present invention relate to methods, apparatus, and computer readable media for generating hierarchical binary structured light patterns and using such patterns in a structured light imaging device. In one aspect, a method of image processing in a structured light imaging device is provided that includes receiving a captured image of a scene, wherein the captured image is captured by a camera of a projector-camera pair in the structured light imaging system, and wherein the captured image includes a pre-determined hierarchical binary pattern projected into the scene by the projector, wherein the pre-determined hierarchical binary pattern was formed by iteratively scaling a lower resolution binary pattern to multiple successively higher resolutions, rectifying the captured image to generated a rectified captured image, extracting a binary image from the rectified captured image at full resolution and at each resolution used to generate the pre-determined hierarchical binary pattern, and using the binary images to generate a depth map of the captured image.

In one aspect, a structured light imaging device is provided that includes a projector component configured to project a pre-determined hierarchical binary pattern into a scene, wherein the pre-determined hierarchical binary pattern was formed by iteratively scaling a lower resolution binary pattern to multiple successively higher resolutions, an imaging sensor component configured to capture images of the scene, wherein the captured images include the pre-determined hierarchical pattern, means for rectifying a captured image to generate a rectified captured image, means for extracting a binary image from the rectified captured image at full resolution and at each resolution used to generate the pre-determined hierarchical binary pattern, and means for using the binary images to generate a depth map of the captured image.

In one aspect, a non-transitory computer-readable medium is provided that stores instructions that, when executed by at least one processor in a structured light imaging device, cause a method of image processing to be performed. The method includes receiving a captured image of a scene, wherein the captured image is captured by a camera of a projector-camera pair in the structured light imaging system, and wherein the captured image includes a pre-determined hierarchical binary pattern projected into the scene by the projector, wherein the pre-determined hierarchical binary pattern was formed by iteratively scaling a lower resolution binary pattern to multiple successively higher resolutions, rectifying the captured image to generated a rectified captured image, extracting a binary image from the rectified captured image at full resolution and at each resolution used to generate the pre-determined hierarchical binary pattern, and using the binary images to generate a depth map of the captured image.

BRIEF DESCRIPTION OF THE DRAWINGS

Particular embodiments in accordance with the invention will now be described, by way of example only, and with reference to the accompanying drawings.

DETAILED DESCRIPTION OF EMBODIMENTS OF THE INVENTION

Figure 1:
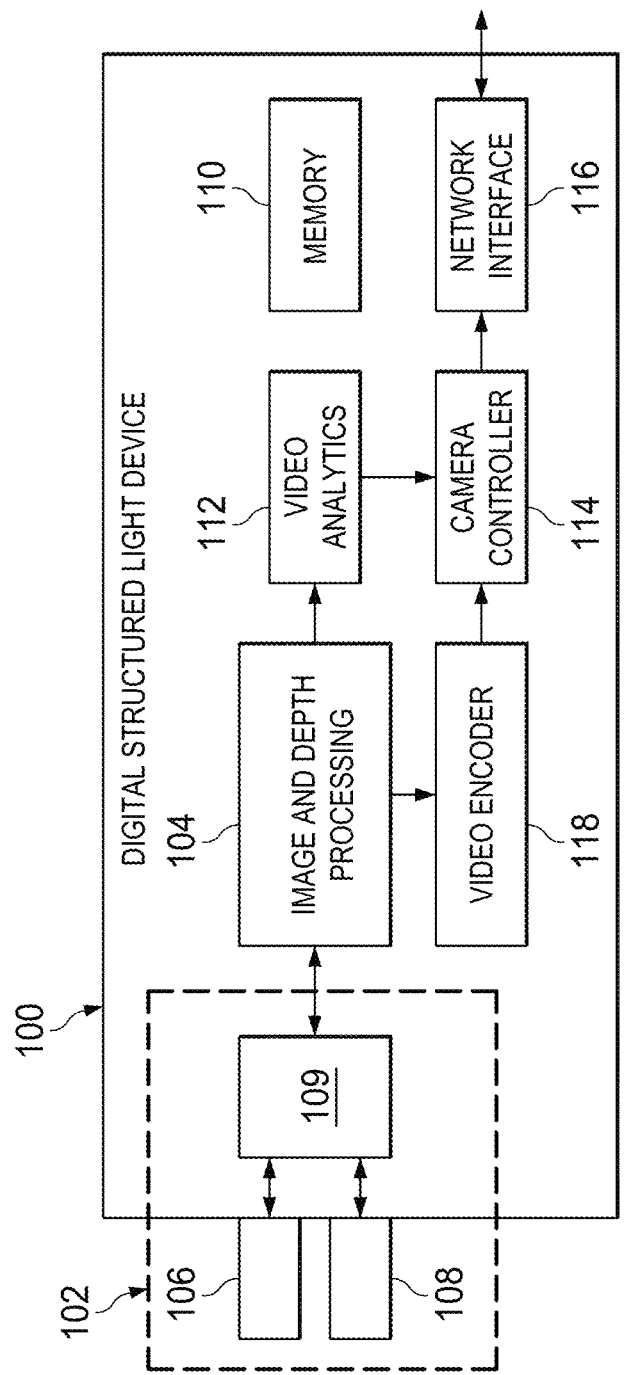
FIG. 1 is a block diagram of an example digital structured light device.

Specific embodiments of the invention will now be described in detail with reference to the accompanying figures. Like elements in the various figures are denoted by like reference numerals for consistency.

As previously mentioned, single pattern structured light imaging devices typically use a projection pattern with a single spatial frequency selected based on the use case of the device which determines the accuracy and depth range of such devices. Embodiments of the invention provided for generation and use of fixed (single) composite binary patterns composed of low, mid and high frequency structures that extend the depth range of structured light imaging devices using such a pattern while also improving the accuracy of capturing the details in the scene. Such patterns are referred to as hierarchical binary patterns or hierarchical binary projection patterns herein.

Figure 2:
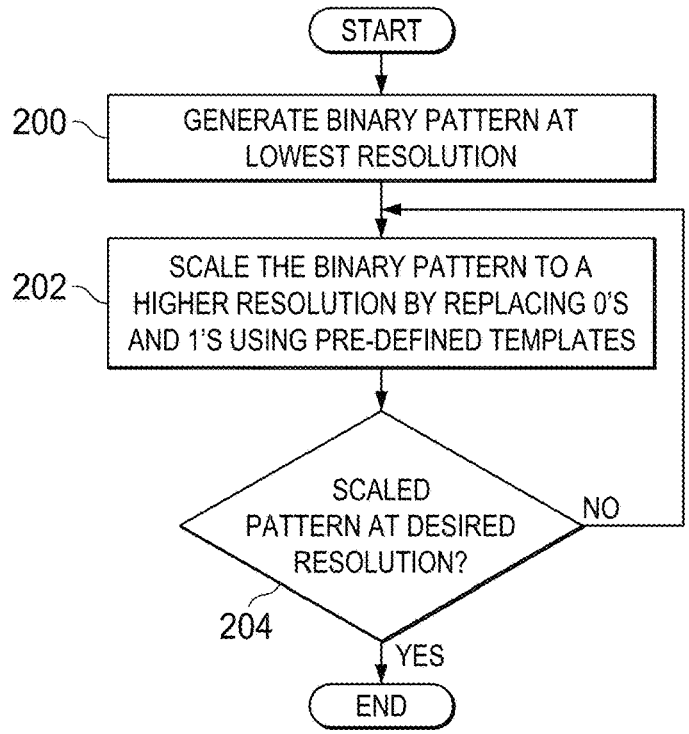
FIGS. 2 and 3 are flow diagrams of methods.

FIG. 1 is a block diagram of an example digital structured light device 100 configured to use a hierarchical binary projection pattern. More specifically, the digital structured light device 100 is configured to perform an embodiment of the method of FIG. 3 to generate depth images in which a hierarchical binary projection pattern generated according to an embodiment of the method of FIG. 2 is used.

The digital structured light device 100 includes a structured light imaging system 102, an image and depth processing component 104, a video encoder component 118, a memory component 110, a video analytics component 112, a camera controller 114, and a network interface 116. The components of the digital structured light device 100 may be implemented in any suitable combination of software, firmware, and hardware, such as, for example, one or more digital signal processors (DSPs), microprocessors, discrete logic, application specific integrated circuits (ASICs), field-programmable gate arrays (FPGAs), etc. Further, software instructions may be stored in memory in the memory component 110 and executed by one or more processors (not specifically shown).

The structured light imaging system 102 includes an imaging sensor component 106, a projector component 108, and a controller component 109 for capturing images of a scene. The imaging sensor component 106 is an imaging sensor system arranged to capture image signals of a scene and the projector component 108 is a projection system arranged to project a hierarchical binary pattern of light into the scene. The hierarchical binary pattern is generated off-line as per an embodiment of the method of FIG. 2 and stored in the structured light imaging system 102. The imaging sensor component 106 includes a lens assembly, a lens actuator, an aperture, and an imaging sensor. The projector component 108 includes a projection lens assembly, a lens actuator, an aperture, a light source, and projection circuitry. The structured light imaging system 102 also includes circuitry for controlling various aspects of the operation of the system, such as, for example, aperture opening amount, exposure time, synchronization of the imaging sensor component 106 and the projector component 108, etc. The controller component 109 includes functionality to convey control information from the camera controller 114 to the imaging sensor component 106 and the projector component 108, to convert analog image signals from the imaging sensor component 106 to digital image signals, and to provide the digital image signals to the image and depth processing component 104.

In some embodiments, the imaging sensor component 106 and the projection component 108 may be arranged vertically such that one component is on top of the other, i.e., the two components have a vertical separation baseline. In some embodiments, the imaging sensor component 106 and the projection component 108 may be arranged horizontally such that one component is next to the other, i.e., the two components have a horizontal separation baseline.

The image and depth processing component 104 divides the incoming digital signal(s) into frames of pixels and processes each frame to enhance the image data in the frame. The processing performed may include one or more image enhancement techniques such as, for example, one or more of black clamping, fault pixel correction, color filter array (CFA) interpolation, gamma correction, white balancing, color space conversion, edge enhancement, denoising, contrast enhancement, detection of the quality of the lens focus for auto focusing, and detection of average scene brightness for auto exposure adjustment on each of the left and right images.

The image and depth processing component 104 then uses the enhanced image data to generate a depth image, which may be converted to a 3D point cloud. A depth image is the two dimensional (2D) representation of a 3D point cloud. More specifically, the image and depth processing component performs the image processing steps of the method of FIG. 3 to generate a depth image, which may be converted to a 3D point cloud in some embodiments. The enhanced captured image is provided to the video encoder component 108 and the depth image and enhanced captured image are provided to the video analytics component 112.

The video encoder component 108 encodes the image in accordance with a video compression standard such as, for example, the Moving Picture Experts Group (MPEG) video compression standards, e.g., MPEG-1, MPEG-2, and MPEG-4, the ITU-T video compressions standards, e.g., H.263 and H.264, the Society of Motion Picture and Television Engineers (SMPTE) 421 M video CODEC standard (commonly referred to as "VC-1"), the video compression standard defined by the Audio Video Coding Standard Workgroup of China (commonly referred to as "AVS"), the ITU-T/ISO High Efficiency Video Coding (HEVC) standard, etc.

The memory component 110 may be on-chip memory, external memory, or a combination thereof. Any suitable memory design may be used. For example, the memory component 110 may include static random access memory (SRAM), dynamic random access memory (DRAM), synchronous DRAM (SDRAM), read-only memory (ROM), flash memory, a combination thereof, or the like. Various components in the digital structured light device 100 may store information in memory in the memory component 110 as a video stream is processed. For example, the video encoder component 108 may store reference data in a memory of the memory component 110 for use in encoding frames in the video stream. The memory component 110 may also store calibration (rectification) parameters and the projected hierarchical binary pattern image for use by the image and depth processing component 104 in performing the method of FIG. 3.

Further, the memory component 110 may store any software instructions that are executed by one or more processors (not shown) to perform some or all of the described functionality of the various components. Some or all of the software instructions may be initially stored in a computer-readable medium such as a compact disc (CD), a diskette, a tape, a file, memory, or any other computer readable storage device and loaded and stored on the digital structured light device 100. In some cases, the software instructions may also be sold in a computer program product, which includes the computer-readable medium and packaging materials for the computer-readable medium. In some cases, the software instructions may be distributed to the digital structured light device 100 via removable computer readable media (e.g., floppy disk, optical disk, flash memory, USB key), via a transmission path from computer readable media on another computer system (e.g., a server), etc.

The camera controller component 114 controls the overall functioning of the digital structured light device 100. For example, the camera controller component 114 may adjust the focus and/or exposure of the structured light imaging system 102 based on the focus quality and scene brightness, respectively, determined by the image and depth processing component 104. The camera controller component 114 also controls the transmission of the encoded video stream via the network interface component 116 and may control reception and response to camera control information received via the network interface component 116.

The network interface component 116 allows the digital structured light device 100 to communicate with other systems, e.g., a monitoring system, via a network such as, for example, a local area network (LAN), a wide area network (WAN) such as the Internet, a cellular network, any other similar type of network and/or any combination thereof. The network interface component 116 may use any suitable network protocol(s).

The video analytics component 112 analyzes the content of images in the captured video stream to detect and determine temporal events not based on a single image. The analysis capabilities of the video analytics component 112 may vary in embodiments depending on such factors as the processing capability of the digital structured light device 100, the particular application for which the digital structured light device 100 is being used, etc. For example, the analysis capabilities may range from video motion detection in which motion is detected with respect to a fixed background model to people counting, detection of objects crossing lines or areas of interest, vehicle license plate recognition, object tracking, facial recognition, automatically analyzing and tagging suspicious objects in a scene, activating alarms or taking other actions to alert security personnel, etc.

FIG. 2 is a flow diagram of a method for generating a hierarchical binary pattern for use in a structured light imaging device, e.g., the digital structured light device 100 of FIG. 1. This method may be performed offline to generate a hierarchical binary pattern, i.e., a hierarchical binary pattern image, that is then stored in a structured light imaging device. The pattern generated by this method contains a mixture of low to high spatial frequency patterns and retains a definite structure under scaling changes.

As shown in FIG. 2, initially a binary black and white pattern is generated 200 at the lowest resolution, e.g., at ¼ or ⅓ of the desired resolution of the hierarchical pattern. Any suitable binary pattern may be used that will contain low-spatial frequencies when scaled up to the full resolution. This binary pattern is then scaled to the next higher resolution, e.g., ½ or ⅓ of the desired resolution, by replacing the ones and zeros using pre-defined templates. Use of the templates adds some amount of high frequency details to the pattern. Any suitable distribution of the templates in the replacement process may be used. In some embodiments, the distribution of the templates is equiprobable which may provide more high-frequency structures at the highest resolution. Templates are explained in more detail below. The particular scale factors to be used are implementation dependent. For example, scaling by a factor of 2× is less complex to implement but scaling by a factor of 3×, while more complex to implement, will provide more robustness in the resulting depth images. Further, the scale factor does not need to be the same at each resolution level.

If the scaled binary pattern is not at the desired resolution 204, the resulting binary pattern is scaled 202 to the next higher resolution using the templates. The scaling is repeated until the scaled binary pattern is at the desired resolution. The final scaled binary pattern is the hierarchical binary pattern. FIG. 1 is an example illustrating scaling of a binary pattern from a lowest resolution to a higher resolution and then to a yet higher resolution to generate a full resolution hierarchical pattern.

A template defines a pattern of 0's and 1's that will replace a single bit in a binary pattern. Each bit in the binary pattern is replaced according to a template to scale the binary pattern to the next highest resolution. Accordingly, the size of a template depends on how much the resolution of the binary image is to be scaled. For example, if the resolution is to be increased by 2× in each dimension, each template will be 2×2. If the resolution is to be increased by 3× in each dimension, each template will be 3×3. More generically, if the resolution is to be increase by M× in one dimension and N× in the other dimension, each template will be M×N. Within a template, any suitable pattern of 0's and 1's may be used with the restriction that a template for replacing one values has more ones than zeros and a templates for replacing zero values has more zeros than ones. The number of templates used is implementation dependent and may depend on the choice of scaling factor as the larger the scaling factor, the larger the number of possible templates.

Figure 5:
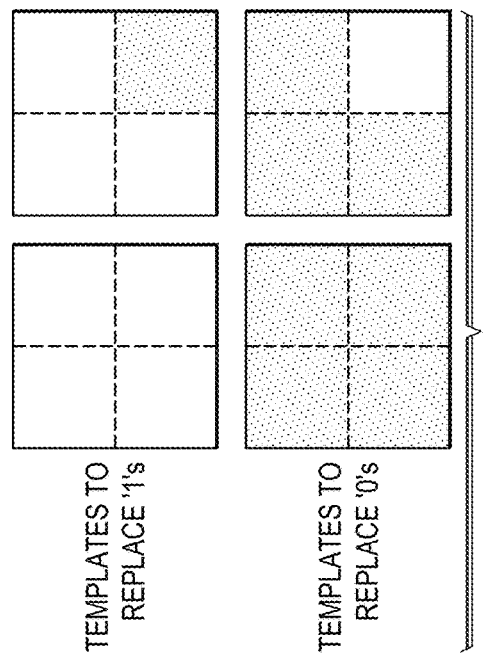

FIG. 5 shows examples of 2×2 templates for replacing 0's and 1's in a binary pattern that may be used when the resolution is to be increased by 2× in each direction. In these templates, the white squares are zeros and the "shaded" squares are ones. Using these templates, each bit in the binary pattern with a value of one will be replaced by one of the two top templates. And, each bit in the binary pattern with a value of zero will be replaced by one of the bottom two templates. The choice of which template to use for each bit may be made equiprobably.

Templates are designed such that a simple down sampling of the resulting binary pattern will result in the original pattern to which the templates were applied. For example, consider the example of FIG. 4. After the templates are applied to scale the smallest binary pattern on the right to the middle binary pattern, a simple down sampling of the middle binary pattern will result in the original smallest binary pattern. This result is assured by designing the templates such that the templates for one values have more ones than zeros and the templates for zero values have more zeros than ones.

Figure 3:
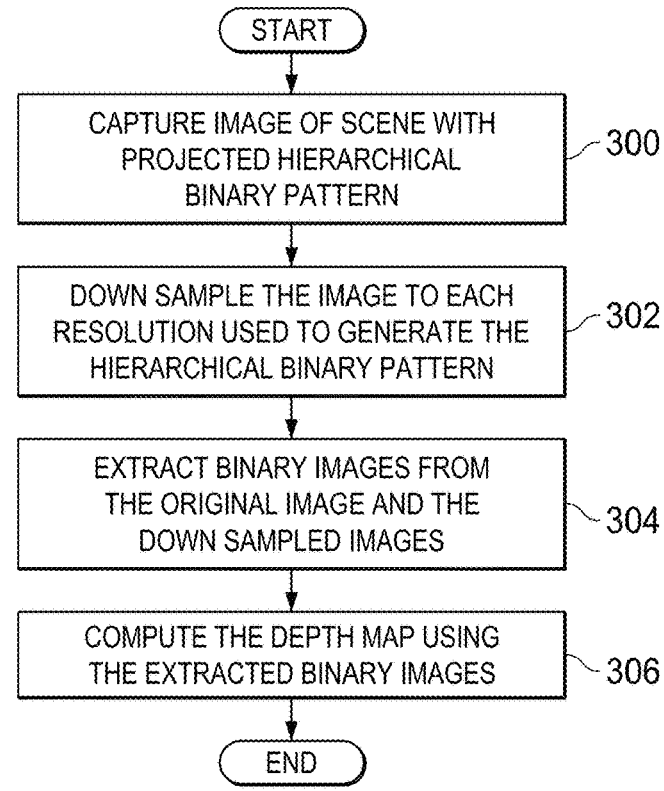

FIG. 3 is a flow diagram of a method for computing a depth map in a structured light imaging system using a hierarchical binary pattern that may be performed, for example, by the digital structured light device 100 of FIG. 1. The hierarchical binary pattern is generated by an embodiment of the method of FIG. 2.

As shown in FIG. 3, initially, an image of a scene into which the hierarchical binary pattern is projected is captured 300 and rectified to match the dimensions of the projected pattern. This rectified image is then down sampled 302 to each resolution used in the generation of the hierarchical binary pattern. For example, if the hierarchical binary pattern was generated beginning with a binary pattern at ¼ the resolution which was scaled to ½ the resolution, and then to the full resolution, the image is down sampled to an image at ½ the resolution and an image at ¼ the resolution. As previously mentioned, the templates used in the generation of the hierarchical binary pattern are designed such that simple down sampling retains the structure of the binary pattern at that resolution. Thus, the structured light imaging system performing the method does not need to know about the templates but rather just needs to know the down sampling scale to be used and how many times to down sample.

Binary images are then extracted 304 from the original image and each of the down sampled images. For example, if the image is down sampled to an image at ½ the resolution and an image at ¼ the resolution, a binary image is extracted from the full resolution image, the ½ resolution image, and the ¼ resolution image. Any suitable technique for extracting the binary images may be used. For example, in some embodiments, the binary images may be extracted using a technique in which a single global threshold is compared to each pixel in an image. For example, if a pixel in the image has a value greater than the global threshold, then the corresponding location in the binary image is set to 1; otherwise, the corresponding location is set to 0.

In another example, the binary images may be extracted using adaptive thresholds as described in U.S. patent application Ser. No. 14/296,172 entitled "Improved Structured Light Depth Imaging under Various Lighting Conditions", filed Jun. 4, 2014. This patent application is incorporated by reference herein in its entirety. In one embodiment, to extract a binary image from an image using adaptive thresholds, a filter is applied to the image to generate a local threshold image having a local threshold value for each pixel in the image. The binary image is then extracted by comparing each pixel in the image to the local threshold value in the corresponding location in the local threshold image. If a pixel in the image has a value greater than the corresponding local threshold, then the corresponding location in the binary image is set to 1; otherwise, the corresponding location is set to 0.

The depth map is then computed 306 using the extracted binary images and the hierarchical binary pattern. The use of the hierarchical binary pattern enables depth map generation using a computationally efficient multistage (multi-resolution) block matching algorithm similar to such algorithms used in stereo image matching for generating a disparity map that is then converted to the depth map. One such algorithm is described in R. Yang and M. Pollefeys, "Multi-Resolution Real-Time Stereo on Commodity Graphics Hardware," Proceedings of the 2003 IEEE Computer Society Conference on Computer Vision and Pattern Recognition, pp. 211-217, Jun. 18-20, 2003.

In such algorithms, the stereo images are down-sampled to a smaller resolution and an initial disparity map is generated using block matching between the two down-sampled images over a search range that may be reduced by an amount corresponding to the reduction in resolution of the images. The stereo images and the disparity map are then up-sampled to a higher resolution, and the block matching performed again to update the up-sampled disparity map. The search range for the block matching for the higher resolution images may be smaller than for the lower resolution images because the search can be confined to a small range in the neighborhood of the disparity estimated at the lower resolution. The up-sampling and block matching are repeated as needed until a full resolution disparity map is generated. This disparity map is then converted to a depth map. The particular lower resolutions used are implementation dependent.

This same technique may be used to generate a full-resolution depth map using the hierarchical pattern and the binary images. An initial disparity map may be generated using block matching between the lowest resolution binary image and the hierarchical pattern down sampled to this lowest resolution. A full search range may be used but the search range is less than that needed for a full resolution block matching search. The resulting disparity map may be up-sampled to the next highest resolution used for generating the hierarchical image, and the block matching performed again using the hierarchical pattern down-sampled to this next highest resolution and the binary image for this next highest resolution. This process may be repeated until a full resolution disparity map is generated. This disparity map is then converted to the depth map.

Figure 4:
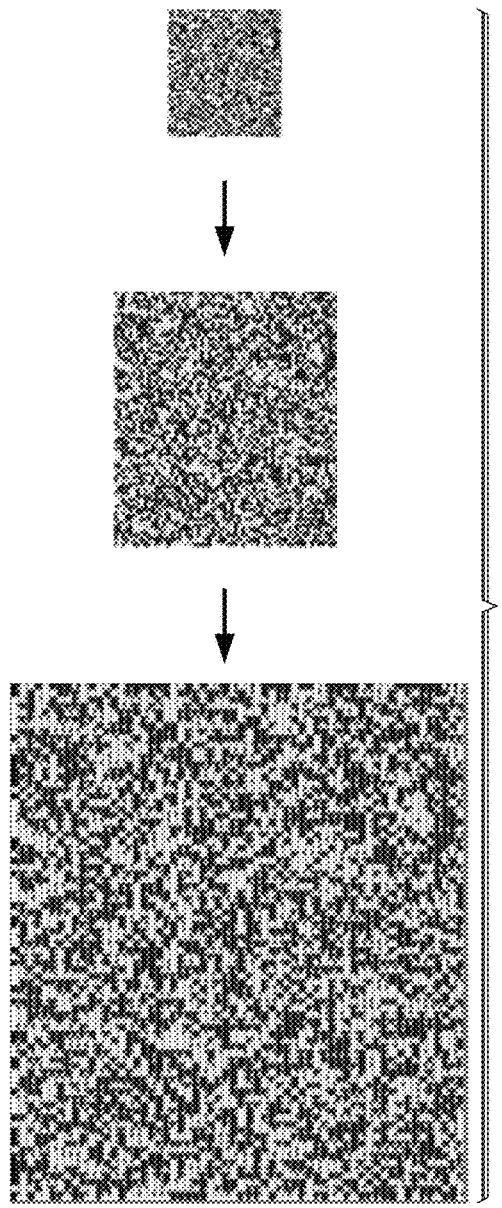
FIGS. 4-9 are examples.
Figure 6:
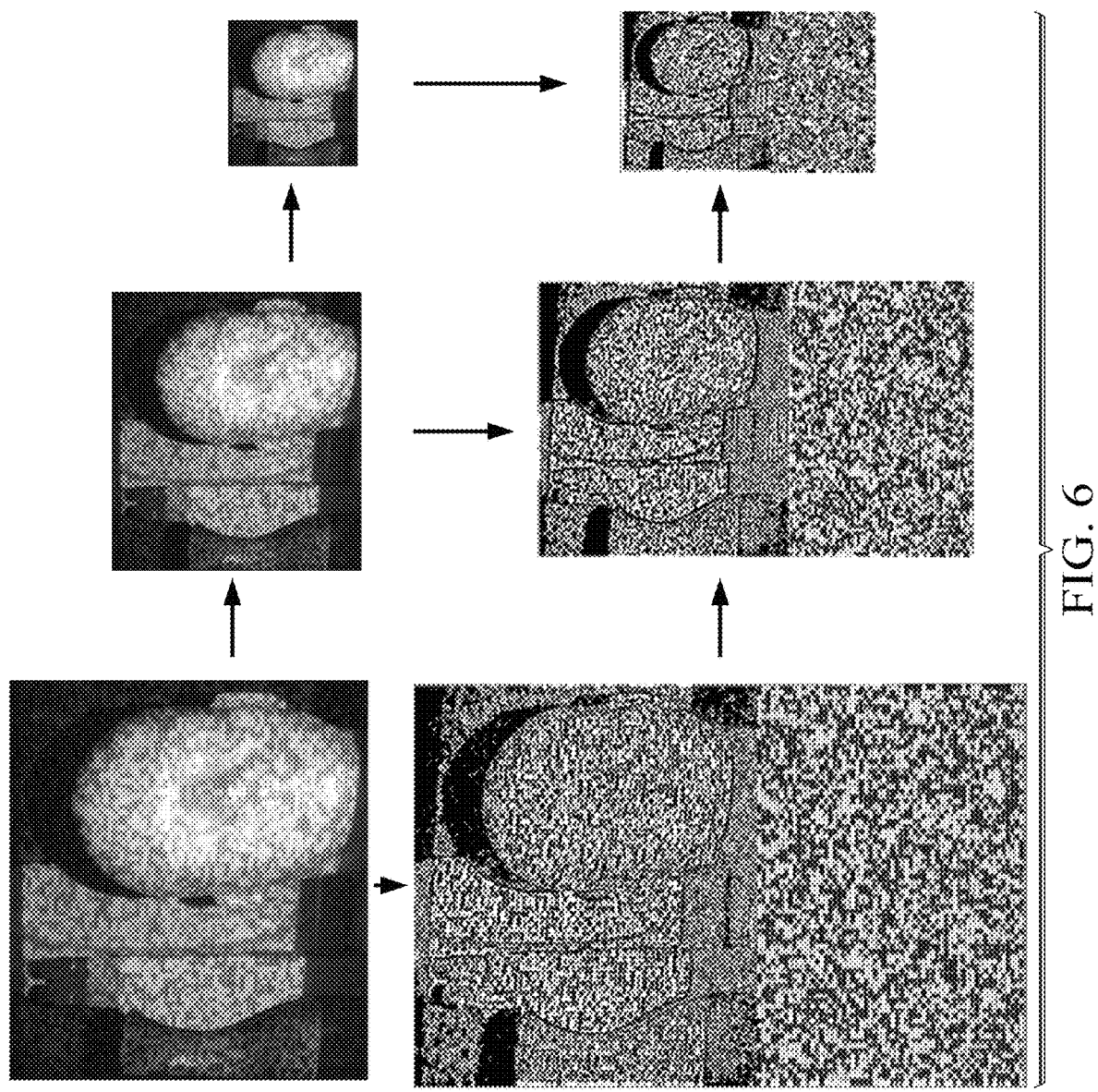
Figure 7:
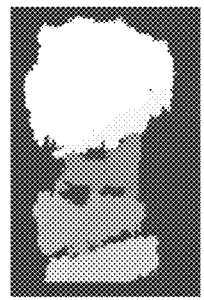
Figure 7:
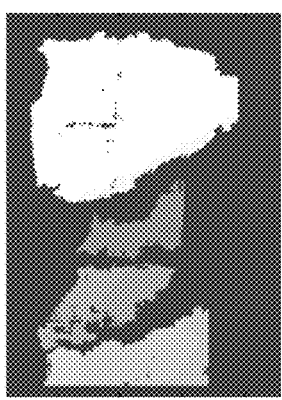
Figure 7:
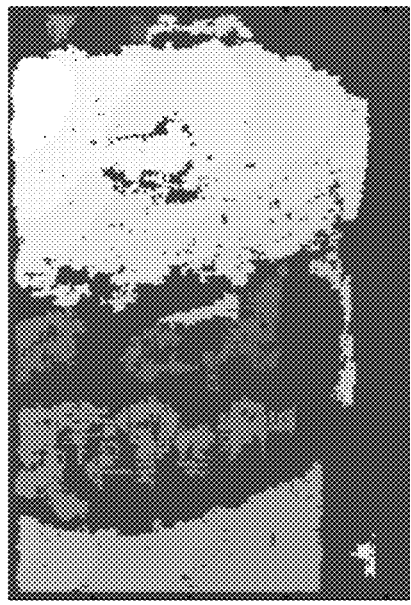
Figure 8:
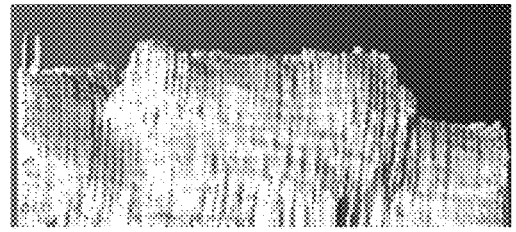
Figure 8:
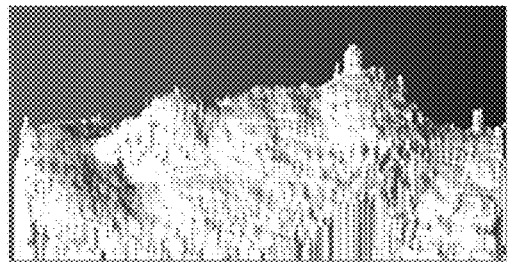
Figure 9:

FIGS. 6-9 are an example illustrating the method of FIG. 3. This example assumes that the hierarchical pattern image was generated as shown in FIG. 4 using the templates of FIG. 5. The images at the top of FIG. 6 are the original full resolution captured image and the down sampled images. The corresponding extracted binary patterns are shown below these images. Note that the extracted pattern at each resolution will correspond to the binary pattern generated at the given resolution when the hierarchical binary pattern was created. FIG. 7 shows the corresponding disparity maps estimated at the three resolutions (high, mid, and low), and FIG. 8 shows the corresponding depth maps at the three resolutions. As this example illustrates, more detail can be extracted from the scene at the higher spatial frequency of the hierarchical binary pattern while the lower spatial frequency effectively captures depth in the background farther away from the structured light imaging device. FIG. 9 shows the final composite disparity map generated using the multistage block matching algorithm.

A hierarchical binary pattern may also be used in assisted stereo based algorithms to improve the depth image. Stereo imaging works on the principal of matching texture from left and right images of a scene captured from left and right cameras. Adding a projected textured pattern such as a hierarchical binary pattern described herein to a stereo imaging system can improve the texture matching in scenes that would otherwise not exhibit much texture.

OTHER EMBODIMENTS

While the invention has been described with respect to a limited number of embodiments, those skilled in the art, having benefit of this disclosure, will appreciate that other embodiments can be devised which do not depart from the scope of the invention as disclosed herein.

Embodiments of the methods described herein may be implemented in hardware, software, firmware, or any combination thereof. If completely or partially implemented in software, the software may be executed in one or more processors, such as a microprocessor, application specific integrated circuit (ASIC), field programmable gate array (FPGA), or digital signal processor (DSP). The software instructions may be initially stored in a computer-readable medium and loaded and executed in the processor. In some cases, the software instructions may also be sold in a computer program product, which includes the computer-readable medium and packaging materials for the computer-readable medium. In some cases, the software instructions may be distributed via removable computer readable media, via a transmission path from computer readable media on another digital system, etc. Examples of computer-readable media include non-writable storage media such as read-only memory devices, writable storage media such as disks, flash memory, memory, or a combination thereof.

It is therefore contemplated that the appended claims will cover any such modifications of the embodiments as fall within the true scope of the invention.

What is claimed is:

1. A method comprising:
    projecting, by a projector, a hierarchical binary pattern, wherein the hierarchical binary pattern is formed by scaling a lower resolution binary pattern at a first resolution to a higher resolution binary pattern at a second resolution, wherein the scaling replaces a binary number in the lower resolution binary pattern with a two-dimensional binary pattern;
    receiving a captured image of a scene, wherein the captured image is captured by a camera of a projector-camera pair, the captured image comprises the hierarchical binary pattern;

rectifying the captured image;
extracting a binary image from the rectified captured image at the first resolution and at the second resolution; and
using the binary image at the first resolution and the binary image at the second resolution to generate a depth map of the captured image.

2. The method of claim 1, wherein the hierarchal binary pattern is formed by a method comprising:
generating a binary pattern at a lowest desired resolution; and
scaling the binary pattern to a next highest desired resolution using first templates to replace zeros in the binary pattern and using second templates to replace ones in the binary pattern, wherein a template is a two-dimensional pattern of zeros and ones.

3. The method of claim 2, wherein first templates each have more zeros than ones and second templates have more ones than zeros.

4. The method of claim 2, wherein using first templates comprises using the first templates to equiprobably replace zeros and using second templates comprises using the second templates to equiprobably replace ones.

5. The method of claim 1, wherein extracting a binary image comprises:
down sampling the rectified captured image to each resolution used to generate the pre-determined hierarchical binary pattern to generate lower resolution images; and,
for each image of the rectified captured image and the lower resolution images:
applying a filter to the image to generate a local threshold image, wherein the local threshold image comprises a local threshold value for each pixel in the image; and
extracting a binary image from the image wherein a value of each location in the binary image is determined based on a comparison of a value of a pixel in a corresponding location in the image to a local threshold value in a corresponding location in the local threshold image.

6. The method of claim 5, wherein extracting a binary image from the image comprises setting a location in the binary image to one when a value of a pixel in a corresponding location in the image is greater than a local threshold value in a corresponding location in the local threshold image and setting the value of the location in the binary image to zero when the value of the pixel is less than the local threshold value.

7. A structured light imaging device comprising:
a projector component configured to project a hierarchical binary pattern, wherein the hierarchical binary pattern was formed by scaling a lower resolution binary pattern at a first resolution to a higher resolution binary pattern at a second resolution, wherein the scaling replaces a binary number in the lower resolution binary pattern with a two-dimensional binary pattern;
an imaging sensor component configured to capture images of the scene, wherein the captured images comprise the hierarchical pattern;
means for rectifying a captured image to generate a rectified captured image;
means for extracting a binary image from the rectified captured image at the first resolution and at the second resolution; and
means for using the binary image at the first resolution and the second resolution to generate a depth map of the captured image.

8. The structured light imaging device of claim 7, wherein the hierarchal binary pattern is formed by a method comprising:
generating a binary pattern at a lowest desired resolution; and
scaling the binary pattern to a next highest desired resolution using first templates to replace zeros in the binary pattern and using second templates to replace ones in the binary pattern, wherein a template is a two-dimensional pattern of zeros and ones.

9. The structured light imaging device of claim 8, wherein first templates each have more zeros than ones and second templates have more ones than zeros.

10. The structured light imaging device of claim 8, wherein using first templates comprises using the first templates to equiprobably replace zeros and using second templates comprises using the second templates to equiprobably replace ones.

11. The structured light imaging device of claim 7, wherein the means for extracting a binary image:
down samples the rectified captured image to each resolution used to generate the pre-determined hierarchical binary pattern to generate lower resolution images; and,
for each image of the rectified captured image and the lower resolution images:
applies a filter to the image to generate a local threshold image, wherein the local threshold image comprises a local threshold value for each pixel in the image; and
extracts a binary image from the image wherein a value of each location in the binary image is determined based on a comparison of a value of a pixel in a corresponding location in the image to a local threshold value in a corresponding location in the local threshold image.

12. The structured light imaging device of claim 11, wherein the means for extracting a binary image extracts a binary image from the image by setting a location in the binary image to one when a value of a pixel in a corresponding location in the image is greater than a local threshold value in a corresponding location in the local threshold image and setting the value of the location in the binary image to zero when the value of the pixel is less than the local threshold value.

13. A non-transitory computer-readable medium storing instructions that, when executed by at least one processor, cause a method of image processing to be performed, the method comprising:
projecting a hierarchical binary pattern, wherein the hierarchical binary pattern is formed by scaling a lower resolution binary pattern at a first resolution to a higher resolution binary pattern at a second resolution, wherein the scaling replaces a binary number in the lower resolution binary system with a two-dimensional binary pattern;
receiving a captured image of a scene, wherein the captured image is captured by a camera of a projector-camera pair, the captured image comprises the hierarchical binary pattern;
rectifying the captured image to generated a rectified captured image;

extracting a binary image from the rectified captured image at the first resolution and the second resolution; and using the binary image at the first resolution and the binary image at the second resolution to generate a depth map of the captured image.

14. The non-transitory computer-readable medium of claim 13, wherein the hierarchal binary pattern is formed by a method comprising:

generating a binary pattern at a lowest desired resolution; and scaling the binary pattern to a next highest desired resolution using first templates to replace zeros in the binary pattern and using second templates to replace ones in the binary pattern, wherein a template is a two-dimensional pattern of zeros and ones.

15. The non-transitory computer-readable medium of claim 14, wherein first templates each have more zeros than ones and second templates have more ones than zeros.

16. The non-transitory computer-readable medium of claim 14, wherein using first templates comprises using the first templates to equiprobably replace zeros and using second templates comprises using the second templates to equiprobably replace ones.

17. The non-transitory computer-readable medium of claim 13, wherein extracting a binary image comprises:

down sampling the rectified captured image to each resolution used to generate the pre-determined hierarchical binary pattern to generate lower resolution images; and, for each image of the rectified captured image and the lower resolution images:

applying a filter to the image to generate a local threshold image, wherein the local threshold image comprises a local threshold value for each pixel in the image; and extracting a binary image from the image wherein a value of each location in the binary image is determined based on a comparison of a value of a pixel in a corresponding location in the image to a local threshold value in a corresponding location in the local threshold image.

18. The non-transitory computer-readable medium of claim 17, wherein extracting a binary image from the image comprises setting a location in the binary image to one when a value of a pixel in a corresponding location in the image is greater than a local threshold value in a corresponding location in the local threshold image and setting the value of the location in the binary image to zero when the value of the pixel is less than the local threshold value.

* * * * *